May 11, 1965 W. J. G. WISCHHOEFER 3,182,935
VEHICLE ARRESTING GEAR SYSTEM
Filed July 30, 1964 3 Sheets-Sheet 1
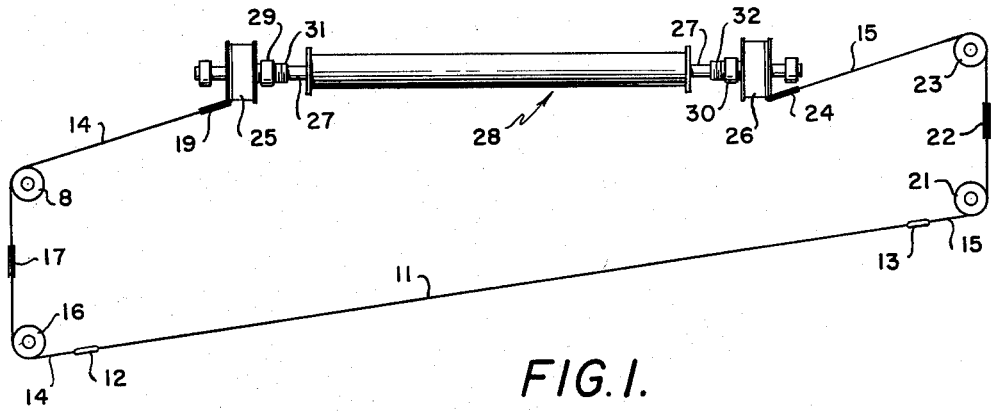
FIG. 1.
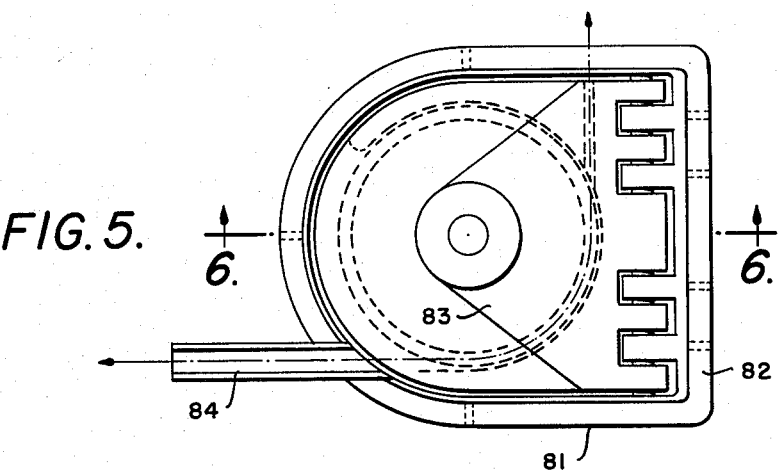
FIG. 5.
FIG. 6.
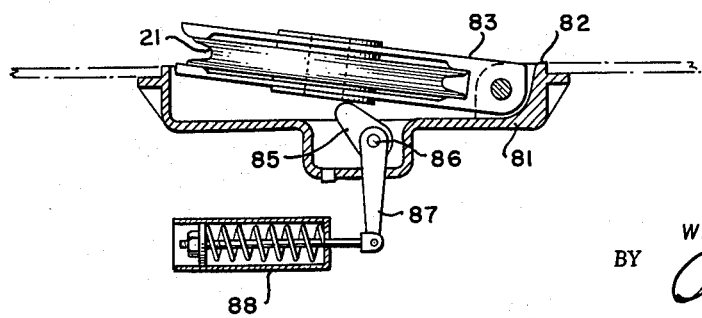
INVENTOR.
WILLIAM WISCHHOEFER
BY *O. P. Hodges*
ATTY.

May 11, 1965   W. J. G. WISCHHOEFER   3,182,935
VEHICLE ARRESTING GEAR SYSTEM
Filed July 30, 1964   3 Sheets-Sheet 2
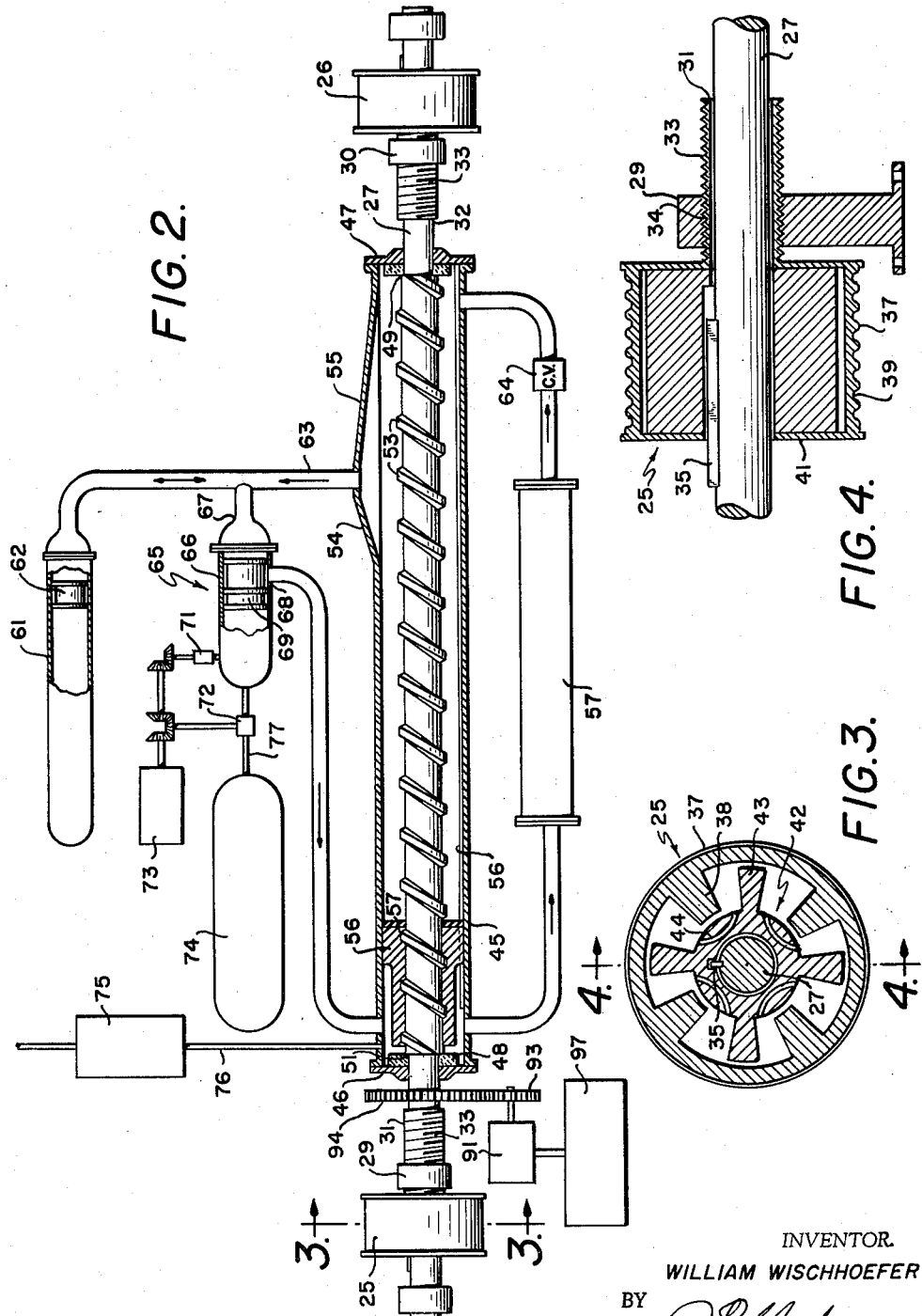
INVENTOR.
WILLIAM WISCHHOEFER
BY
ATTY.

May 11, 1965    W. J. G. WISCHHOEFER    3,182,935
VEHICLE ARRESTING GEAR SYSTEM
Filed July 30, 1964    3 Sheets-Sheet 3

INVENTOR.
WILLIAM WISCHHOEFER
BY
*D. E. Hodges*
ATTY.

United States Patent Office 3,182,935
Patented May 11, 1965

3,182,935
VEHICLE ARRESTING GEAR SYSTEM
William J. G. Wischhoefer, 1202 Musket Court, Fairfax County, Va.
Filed July 30, 1964, Ser. No. 386,461
12 Claims. (Cl. 244—110)
(Granted under Title 35, U.S. Code (1952), sec. 266)

The invention described herein may be manufactured and used by or for the Government of the United States of America for governmental purposes without the payment of any royalties thereon or therefor.

The present invention relates to an aircraft arresting system, more particularly to an aircraft arresting system for shipboard use.

Devices of this nature are subjected to great stresses and are required to dissipate very large quantities of energy. This has in the past necessitated very large systems of great weight and even then there were parts of the system which were subject to frequent breakage under the stresses encountered.

In operation systems of this nature are required to bring to rest aircraft which, for example, may weigh 50,000 lbs., be traveling 120 knots and are to be stopped within a distance of 350 feet.

In general, the system of the present invention accomplishes its intended purpose by converting the kinetic energy of the moving vehicle into pressure and heat.

It is, therefore, an object of this invention to provide a system for arresting moving vehicles.

Another object of this invention is to provide a simplified system for arresting moving vehicles such as aircraft.

Another object of this invention is to provide a vehicle arresting system suitable for shipboard use.

Another object of this invention is to provide an arresting system having a self-powered restoring system.

Another object of this invention is to provide an arresting system in which the pendant sheaves are movable from a position flush with the deck to a raised position for the arresting operation.

Another object of this invention is to provide an arresting system in which the purchase cable reel is self aligning.

Another object of this invention is to provide an arresting system in which the purchase cable reel is shock absorbing.

Another object of this invention is to provide an arresting system in which the energy absorbing mechanism is hydraulic.

Another object of this invention is to provide an arresting system in which the energy of the arrested vehicle is stored to provide the energy to restore the system to its initial condition.

Other objects and features of the invention will become apparent to those skilled in the art as the disclosure is made in the following description of a preferred embodiment of the invention as illustrated in the accompanying sheets of drawings in which:

FIG. 1 is a plan view of the system of this invention.

FIG. 2 a diagram of a first version of this invention partially in section.

FIG. 3 is a sectional view through the cable reel taken on line 3—3 of FIG. 2.

FIG. 4 is a view, partially in section, along the line 4—4 of FIG. 3 showing the support and lead screw for the reel.

FIG. 5 is a plan view of the deck sheave and mounting.

FIG. 6 is a view partially in section along the line 6—6 of FIG. 5.

Figure 7:
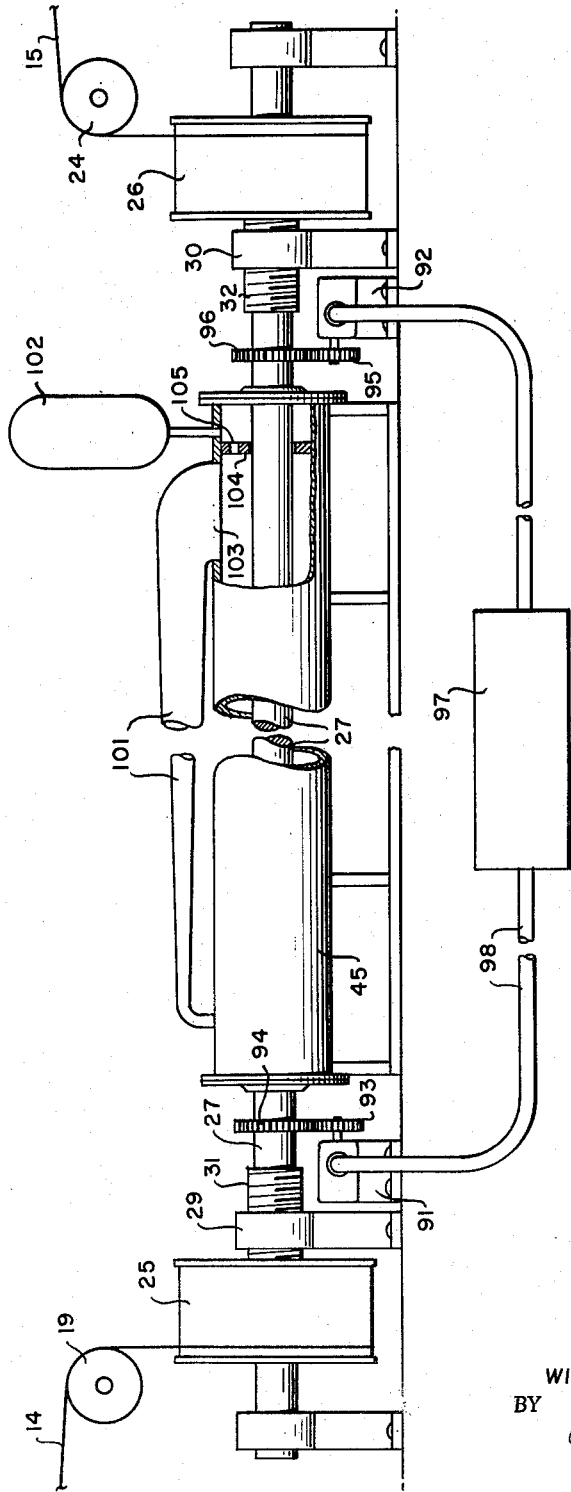
FIG. 7 is a diagram of a second version of the invention, broken to conserve drawing space.

Referring now to the drawings, wherein like reference characters designate like or corresponding parts throughout the several views, there is shown in FIG. 1 a pendant cable 11 attached by coupling 12 and 13 to purchase cables 14 and 15 respectively. The purchase cable 14 passes over sheaves 16, 17, 18 and 19 and cable 15 correspondingly passes over sheaves 21, 22, 23 and 24 to reels 25 and 26 respectively. Reels 25 and 26 are mounted on the shaft 27 of the energy absorption unit 28. The hubs of reels 25 and 26 have extended portions 31 and 32 which pass through the fixed supports 29 and 30 and each of which have external threads 33 to mate with the internal threads 34 of the supports, as shown in FIG. 4. The reel 25 is slidably mounted on the shaft 27 and is keyed to rotate with the shaft 27 by key 35.

The reel 25 consists of an outer cylindrical member 37 which has its outer cylindrical surface grooved, as at 39, to receive the purchase cable 14 and has internal vane members 38. Member 37 is supported on shaft 27 by the end plates 41 and 42 which together with hub member 31 form a fluid retaining cylinder. Mounted within the member 37 is a vaned member 36 having vanes 43 which coact with vanes 38 to provide a shock absorbing element. To further the operation of the reel as a shock absorbing element there are passages 44 provided in the vaned member 36. The vaned member is keyed to the shaft 27 by key 35. The reel 26 is similarly constructed.

The energy absorption unit 28, as shown in FIG. 2, comprises a tubular member 45 through which shaft 27 passes. Member 45 has end plates 46 and 47 which respectively provide thrust bearings 48 and 49 for shaft 27. Shaft 27 has shoulders 51 and 52 which coact with bearings 48 and 49 respectively. The portion of shaft 27 disposed between bearings 48 and 49 is provided with a helical thread 53 of suitable pitch and strength to provide the required rate of arrestment for the vehicle being stopped. The tube member 45 has an enlarged tapered portion 54 which functions as an orifice during the operation of the system. A second tapered portion 55 functions as a decelerating buffer to gradually bring the system to a stop. Slidably mounted in the tube 45 is a piston 56 which surrounds shaft 27 and has internal threads 50 which mate with those on shaft 27. This piston is keyed against rotation to the tube 45 by a ridge 56 along the inner surface of tube 45.

A fluid cooling system 57 is connected by pipes 58 and 59 to the end portions of tube 45. This cooling system is designed to provide fluid flow around the piston 56 in only one direction and has a check valve 64 in the system for that purpose. The energy absorption unit also includes an energy storage and regulating system which consist of an accumulator 61 having a piston 62 mounted therein. The accumulator 61 is connected to the tube 45 at the juncture of tapered portions 54 and 55 by a pipe 63. Connected between this point and the other end of the tube 45 is a fluid return path which has a pressure control valve 65.

Valve 65 comprises a chamber 66 having inlet 67 and an outlet 68. Slidably mounted in chamber 66 is a pressure actuated piston 69 movable from a position in which it closes outlet 68 to a position in which outlet 68 is open. The position of piston 69 is controlled by an air pressure system including a relief valve 71, a regulating valve 72 and a motor 73 for positioning the valves 71 and 72. The air under pressure is supplied from tank 74 through suitable piping 77 and regulating valve 72 to chamber 66. It is to be understood that valves 71 and 72 may be adapted for operation by hand as well as by motor 73.

In order to maintain the fluid system full, a reservoir 75 is provided to feed additional hydraulic fluid as needed through pipe 76 to tube 45.

Referring specifically to FIGS 5 and 6 to describe the sheaves 16 and 21, there is shown a housing 81 which is mounted into the deck or other surface with its surface 82 substantially flush with the surface in which it is mounted. Pivotally mounted within the housing 81 is a sheave block 83 carrying the sheave, which by way of example may be sheave 21. The housing 81 is shown in FIG. 5 as being connected to groove or trough 84 in the surface in which the sheave housing 81 is mounted. This groove provides storage for pendant cable 11 when the system is inactive. A mechanism comprising an arm 85 which is pivoted on pivot 86 and connected to lever arm 87 which is connected to be actuated by a motor, not shown, and which is biased by counter balance spring 88 operates to raise the sheave.

A hydraulic pump 91 and motor 92, as shown in FIG. 7 may be employed to return the system to its rest position. When employed the pump is geared to be driven by shaft 27 through gears 93 and 94 and the motor 92 is geared to drive the shaft 27 through gears 95 and 96. Pump 91 functions to store the energy of the moving vehicle as it is arrested by pumping fluid into an accumulator 97 through pipe 98. Upon the halting of the vehicle the accumulator 97 discharges through motor 92. It is understood that if desired, the accumulator could be discharged back through pump 91 which would then function as a motor in lieu of motor 92 as shown in FIG. 2. In any event, a suitable control valve would be provided in the pump-motor system to regulate the operation thereof.

The modification of the invention as shown in FIG. 7 consists in replacing the storage and control system of the system of FIG. 2 with a tapered orifice 101 and an accumulator 102. Orifice 101 is connected between the opening 103 and the other end of the tube 45. Within tube 45 adjacent the opening 103 is a diaphragm 104 having one or more passages 105 therethrough. The diaphragm 104 is located between the outlet 103 and the connection to the accumulator 102 and surrounds the shaft 27.

In operation the sheaves 16 and 21 are raised to position the pendant cable 11 for engagement by the vehicle being arrested. When the cable is engaged by the vehicle the kinetic energy of the moving vehicle is transmitted to the energy absorption unit 28 by purchase cables 14 and 15, which are wound on reels 25 and 26 and lie in the grooves provided. The unwinding of cables 14 and 15 transfers the linear motion of the vehicle into rotary motion with the initial shock of the engagement of the vehicle being absorbed in the stretching of the cables and the shock absorbing construction of reels 25 and 26. The rotation of reels 25 and 26, which are slidably keyed to a common shaft 27, operates to drive piston 56 and to provide continuous alignment of the reels 25 and 26 with the cables 14 and 15 and sheaves 24 and 25 through the action of threaded hub portions 31 and 32. The reels slide to maintain the alignment such that the cables leave the reels substantially perpendicularly. Swivels 12 and 13 are provided to reduce the twisting forces on the cables. The fact that the two reels 25 and 26 are keyed to the common shaft 27 serves the useful purpose of tending to compensate for small directional misalignments between the direction of motion of the arrested vehicle and the designed direction for arresting for the system, whether for landing aircraft or other type of vehicle.

As the shaft 27 rotates the engagement between threads within piston 56 and threads 53 on shaft 27 cause piston 56, which is non-rotatably keyed to the tube 45 by ridge 56, to advance along tube 45 thereby pressurizing the hydraulic fluid which fills the tube 45. The fluid, in the system illustrated in FIG. 2, passes through pipe 63 into accumulator 61 compressing the air behind piston 62 until the pressure exceeds the pressure supplied to chamber 66 from storage tank 74 through pipe 77 and regulating valve 72. The pressure applied to chamber 66 from tank 74 is adjusted according to the desired arresting distance and the weight and speed of the vehicle. This adjustment may be made by hand or by means of a remotely controlled motor 73. A relief valve 71 is also adjustable for the purpose of limiting the peak pressures in the system. When the pressure in accumulator 61 exceeds the set pressure in chamber 66, the piston 69 moves to uncover the outlet 68 thus allowing the fluid to flow back into tube 45 behind the piston 56 until the pressure in 61 falls below that set by the valve 72.

As the piston 56 continues to move along tube 45, it reaches the flared portion 54 of tube 45 which acts as a tapered orifice of increasing cross section. This allows an increasing portion of the displaced fluid to by-pass the piston 56, including the fluid stored in accumulator 61, until the piston reaches the flared portion 55 of tube 45. As the piston 56 moves into this section of the tube 45, the tapered portion becomes an orifice of decreasing cross section which functions to gradually bring the piston 56 to rest with this last portion of the tube 45 forming with the piston 56 a hydraulic buffer to protect the end of tube 45. The tube 45 is so designed that the vehicle being arrested will have extended most of its kinetic energy by the time the piston 56 reaches flared portion 54. During arresting phase of the operating cycle of the system the storage tank 75 supplies to the tube 45 sufficient fluid to maintain the tube full of fluid.

On the recovery portion of the operating cycle the pump 91, which has stored fluid in accumulator 97 operates as a motor to drive the system in reverse to return piston 56 to its initial position and to force a portion of the fluid through the cooling system 57. Check valve 64 prevents the fluid from by-passing the piston 56 through the cooling system during the arresting portion of the operating cycle. The thrust produced by the moving of piston 56 is taken by the thrust bearings 48 and 49 through shoulders 51 and 52.

Referring to the modification shown in FIG. 7, the system operates similarly to the system described in relation to FIG. 2 except that in the energy absorption unit the displacement of piston 56 causes fluid to flow under pressure into accumulator 102 and through tapered orifice 101. As the piston 56 advances and passes the outlet 103 it functions with diaphragm 104 as a hydraulic buffer to bring the piston to rest. In this modification the arresting distance and rate are determined by the design of the tapered orifice 101 whose design determines the rate of flow which in turn is determined by the minimum size of the cross section of the orifice and the pressure generated by the piston 56.

Obviously many modifications and variations of the present invention are possible in the light of the above teachings. It is therefore to be understood, that within the scope of the appended claims, the invention may be practiced otherwise than as specifically described.

What is claimed is:
1. A system for arresting the motion of a moving vehicle comprising:
 a hydraulic energy absorbing means having a rotatable shaft
 a cylindrical tube surrounding a portion of said shaft;
 a helical thread formed on the portion of said shaft surrounded by said tube;
 a piston slidable within and keyed against rotation relative to said tube, said piston surrounding said shaft and having mating threads engaging with the threads on said shaft;
 means engageable by a moving vehicle;
 means connected between said vehicle engageable means and said shaft for rotating said shaft when decelerating a vehicle;
 means connected to said hydraulic energy absorbing means for storing a portion of the energy of the moving vehicle; and
 means connected to said shaft and to the energy storage means for restoring the system to its initial operating condition when the vehicle has been arrested.

2. An arresting system as claimed in claim 1 in which said means interconnecting the vehicle engaging means and said energy storage means comprises:
a pair of cable winding reels; one each of said pair being mounted on each of the end portions of said shaft externally of said tube;
a pair of purchase cables; one of said pair being attached at one end to one end of said vehicle engageable means and at the other end attached to one of said reels, the other of said pair being attached to the other end of said vehicle engaging means and to the other of said reels.

3. A system as claimed in claim 2 in which said vehicle engageable means is a pendant cable and which further includes a plurality of sheaves for guiding said purchase cables, one pair of said sheaves being hingedly mounted flush with the surface on which the vehicle moves, means operative to cause said pair of sheaves to extend above the surface when said system is in vehicle arresting condition.

4. A system as claimed in claim 2 in which each of said reels is slidable axially on said shaft and which includes a pair of key means keying respective reels to said shaft to rotate said shaft with the rotation of the reels.

5. A system as claimed in claim 4 including means to cause said reels to slide along said shaft in a direction and at a rate to maintain the perpendicular alignment of the reels with their respective cables.

6. A system as claimed in claim 5 in which said means to cause said reels to slide comprises an externally threaded extended portion of the hub of said reel and a coacting internally threaded stationary support, the pitch of said threads being related to the lay of the cable on said reels.

7. A system as claimed in claim 2 in which each reel comprises:
an exterior cylindrical member having spaced internally extending vanes, and
an internal hub member,
vanes on said hub member which are interpolated between the vanes of the exterior cylindrical member;
said cylindrical member having end walls which with said hub member forms a substantially fluid tight compartment;
fluid passages extending through portions of said hub member between adjacent vanes of said hub member to vent the fluid around the interposed vane from the cylindrical member,
to thereby provide shock absorption means within each of said reels.

8. A system as claimed in claim 1 including means for controlling the rate of deceleration of the vehicle being arrested.

9. A system as claimed in claim 8 in which said means for controlling the rate of deceleration comprises:
an accumulator connected to receive fluid from said tube,
a pressure control valve connected between the opposite ends of said tube,
a source of pressure,
a regulating valve connected between said source and said control valve for determining the operating point of said control valve, said regulating valve being adjustable to condition the system to arrest vehicles of various sizes and speeds.

10. A system as claimed in claim 9 including:
a relief valve connected to said pressure control valve,
means for adjusting said relief valve in accordance with the adjustment of said regulating valve.

11. A system as claimed in claim 1 in which said cylindrical tube has a flared portion adjacent one end;
said flared portion consisting of a first portion which with said piston functions as an orifice of increasing cross section as said piston moves along said shaft, and
a second portion which functions with said piston as an orifice of decreasing cross section as said piston continues to move along said shaft
to thereby provide for venting the fluid past said piston and to provide a buffer to arrest the movement of said piston.

12. A system as claimed in claim 1 which includes:
an accumulator connected to said tube to receive the fluid displaced by said piston, a tapered orifice connected between opposite ends of said tube with the larger opening of said orifice connected adjacent the end of said tube toward which said piston moved during the arresting portion of the cycle of operation of the system,
buffer means mounted within said tube adjacent said large opening of said orifice.

References Cited by the Examiner

UNITED STATES PATENTS

| | | | |
|---|---|---|---|
| 1,701,007 | 2/29 | Libani | 188—91 |
| 2,967,683 | 1/61 | Carter | 244—102 |

ARTHUR L. LA POINT, *Primary Examiner.*